(12) United States Patent
Liu

(10) Patent No.: US 8,905,493 B2
(45) Date of Patent: Dec. 9, 2014

(54) TRACK LINK WITH REPLACEABLE RAIL AND METHOD OF REPLACING WORN RAILS ON TRACK LINKS

(75) Inventor: Tianjun Liu, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 194 days.

(21) Appl. No.: 13/105,137

(22) Filed: May 11, 2011

(65) Prior Publication Data
US 2012/0286567 A1 Nov. 15, 2012

(51) Int. Cl.
*B62D 55/20* (2006.01)
*B62D 55/21* (2006.01)

(52) U.S. Cl.
CPC .................................. *B62D 55/21* (2013.01)
USPC ........................................................ 305/185

(58) Field of Classification Search
USPC .................................. 305/196, 198, 200, 201
See application file for complete search history.

(56) References Cited

U.S. PATENT DOCUMENTS

| | | | | |
|---|---|---|---|---|
| 3,237,999 A | * | 3/1966 | Pentecost | 305/198 |
| 3,359,044 A | * | 12/1967 | Boggs | 305/201 |
| 3,795,431 A | | 3/1974 | Boggs et al. | |
| 3,947,074 A | * | 3/1976 | Nelson | 305/190 |
| 3,955,855 A | | 5/1976 | Massieon et al. | |
| 4,159,857 A | | 7/1979 | Purcell | |
| 4,428,625 A | | 1/1984 | Wohlford | |
| 5,749,635 A | * | 5/1998 | Umbarger | 305/190 |
| 6,565,161 B2 | | 5/2003 | Anderton | |
| 7,040,080 B2 | * | 5/2006 | Okawa et al. | 59/35.1 |
| 7,657,990 B2 | | 2/2010 | Wodrich et al. | |
| 2011/0298274 A1 | * | 12/2011 | Simula et al. | 305/194 |

FOREIGN PATENT DOCUMENTS

WO WO 00/29276 5/2000
WO 2008-112043 9/2008

OTHER PUBLICATIONS

W.R. Thomas, Study and Development of Tracks with Unusual Designs, Caterpillar Tractor Co. Research Department, Nov. 25, 1959.

* cited by examiner

*Primary Examiner* — Joe Morano, IV
*Assistant Examiner* — Jean Charleston
(74) *Attorney, Agent, or Firm* — Miller, Matthias & Hull

(57) ABSTRACT

A composite track link is provided that has a body and a replaceable rail brazed or soldered together to provide a metallurgical bond between the track link body and the rail such that the rail may be removed and replaced by heating the track link or the brazing or soldering filler metal when the rail becomes worn. This process enables the rail to be separated from the body of the track link so a new rail can be brazed or soldered to the body of the track link. As a result, track links or bodies of track links may outlast the rails by multiple use cycles. Further, the body and rail may be formed of different materials.

6 Claims, 4 Drawing Sheets

TRACK LINK WITH REPLACEABLE RAIL AND METHOD OF REPLACING WORN RAILS ON TRACK LINKS

TECHNICAL FIELD

This disclosure relates generally to track-type machines. In particular, this disclosure relates to a part of a link of a track chain that is subject to wear, such as the rail, which engages the sprocket, rollers and idlers during propulsion of the machine.

BACKGROUND

An endless track chain used in tractors, excavators and other track-type machines includes links, track pin bushings, track pins, and shoes. Each section of the track includes a pair of links fastened together with a track pin bushing and a track pin. The bushing couples one pair of links while the track pin fits inside the bushing to hold the next pair of links along the endless track chain. A track shoe is bolted to each connected pair of links to support the machine and provide traction. The design of the shoes may be determined by the environment of intended use (e.g., clay, slit, loam, gravel, snow, mud, or hard surfaces).

The undercarriage assembly components of track-type machines are subjected to severe operating environments. For example, debris, soil, rocks, etc. can enter the track and undercarriage of a track-type machine during operation. These abrasive materials can subsequently accumulate between the engaging surfaces of the undercarriage assembly components or drive equipment thereby causing wear. Further, undercarriage assembly components may be directly ground, worn, pitted, scratched or cracked by such debris, soil or rocks.

Also, due to the functional nature of the track-type machines, the undercarriage parts of these machines are required to be in intimate contact with wet sand, mud or corrosive materials, leading to corrosion. The corrosion cannot be eliminated by hardening the steel with surface treatments such as carburizing, nitriding or other conventional surface treatment methods because they are not cost effective against the high wear and corrosion environment that a track link faces during service. A more expensive material such as highly alloyed steel is generally not used because of increase costs.

A track that is adjusted too tight can increase friction and cause accelerated wear to undercarriage assembly components. On the other hand, a track that is too loose can allow drive sprocket teeth to jump links, especially in reverse, causing wear to undercarriage assembly components such as the sprocket teeth, track pin bushings, bottom rollers, etc.

Therefore, track chain links are subjected to severe wear, corrosion and stress. Wear is mainly caused by direct contact with undercarriage rollers and idlers which themselves are hardened. The wear rate is enhanced due to abrasive action of dirt, sand and other hard materials such as rocks, trapped between the link/idler and link/roller contact surfaces. The wear problem may be further exacerbated when the abrasive material is harder than even the hardened steels. Although wear of links can be mitigated by applying hard faces on the surface of the rail as suggested in U.S. Pat. Nos. 7,657,990 and 3,955,855, the costs associated to the hardfacing materials and processes prevent it from being widely used in practices, especially when surface area is large.

SUMMARY OF THE DISCLOSURE

A composite track link is disclosed that includes a body having a first bearing surface for receiving a replaceable rail. The replaceable rail includes a brazing or soldering surface that is detachably connected to the bearing surface of the track link body by at least one of brazing and soldering.

A method for replacing a worn rail of a track link is also disclosed. The method includes providing a track link having a body with a bearing surface. The bearing surface is connected to a brazing or soldering surface of a worn rail by at least one of brazing and soldering. The method further includes heating the body, worn rail and brazing or soldering material to a temperature above the melting temperature of the brazing or soldering material but less than the melting temperatures of the body and worn rail. The method also includes removing the worn rail from the bearing surface and attaching a new rail to the bearing surface by at least one of brazing and soldering.

An endless track assembly is also disclosed that includes at least one track link having a body having a first bearing surface for receiving a replaceable rail. The replaceable rail includes a brazing or soldering surface that is detachably connected to the bearing surface of the at least one link body by at least one of brazing and soldering.

A replacement rail for repairing a track link that includes a replaceable worn rail connected to a bearing surface of the link body is also disclosed. The replacement rail includes a rail body having a lower brazing or soldering surface and an upper bearing surface. The lower brazing or soldering surface is used for brazing or soldering the replacement rail to the bearing surface of the link body after removal of the worn rail.

DETAILED DESCRIPTION OF THE PRESENTLY PREFERRED EMBODIMENTS

Additional solutions for extending the wear life of a track link include the use of replaceable link rails, i.e., the portion of the link that engages the rollers. However, such replaceable rails are bolted and/or tack-welded to the link as shown in U.S. Pat. Nos. 3,947,074 and 4,159,857. The use of bolts does not provide enough joint strength between the rail and the body of the link; welding increases the joint strength, but makes it extremely difficult, if not impossible, to remove and replace the rail when it becomes worn or corroded. Hence, a new technique for replacing worn rails of track links is disclosed along with a new replaceable rail.

There are a number of options when it comes to joining metal parts, including adhesive bonding, nuts and bolts, and many other types of mechanical fasteners. But for strong and permanent metal joints, the choice usually comes down to fusion welding, brazing, and soldering.

Fusion welding joins metals by melting and fusing them, usually adding a filler material. Fusion requires concentrated heat directly at the joint, and temperatures must exceed the melting point of the base metals and filler. Welded joints are permanent and the joint may be as strong as or stronger than the base materials.

Brazing and soldering differ from fusion welding in that the temperature is considerably lower and does not melt the base metals. Rather, the heat source melts a filler metal and draws it into the seam disposed between two parts by capillary action, which creates a metallurgical bond between the filler metal and part surfaces. Brazed or soldered joints may also be as strong as or stronger than the base materials, but brazing and soldering have been surprisingly found to be very useful in connecting a replaceable rail to track link body that may have a longer working life due to the ability to replace a worn rail.

Figure 1:
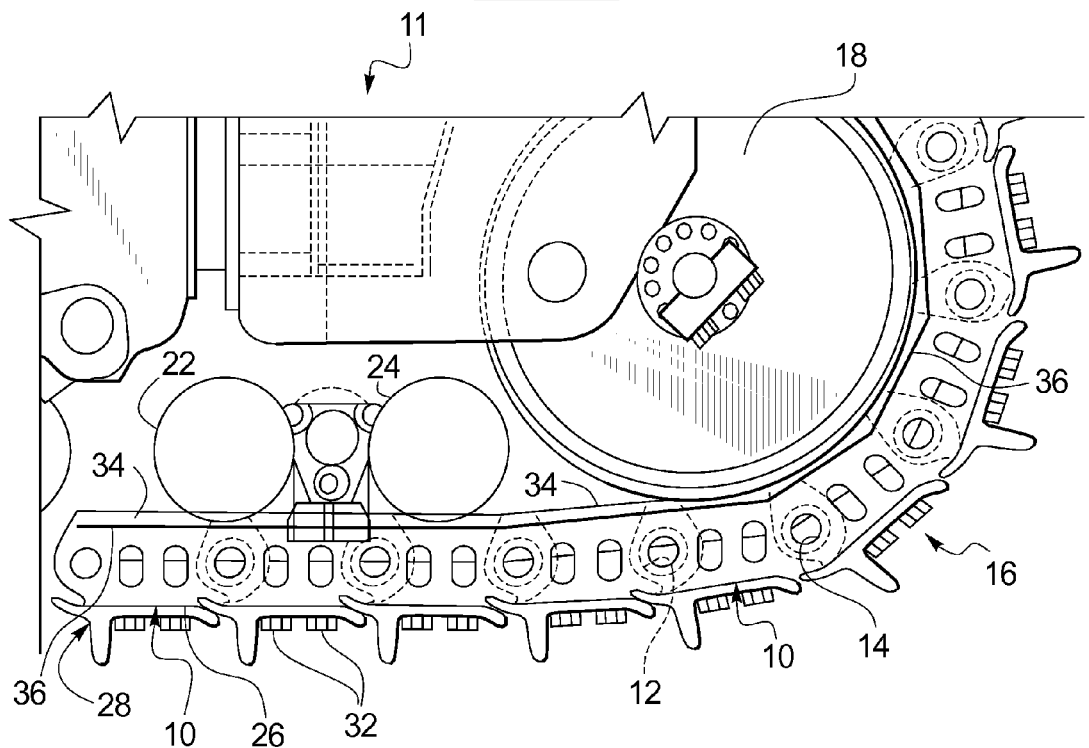
FIG. 1 is a partial side view of a lower rear portion of a track-type machine having an endless track assembly.

Referring to FIG. 1, a typical track link 10 includes a relatively flat body with a pair of bores 12, 14 disposed at opposite ends of the link 10 for receiving connection mechanisms in the form of a track pin bushing, a track pin and, in the case of a mastered link, a master pin. The function of the track pin bushings is to connect a pair of parallel links or two side-by-side links 10 together while the function of the pins is to connect one pair of track links to the next pair of track links along the endless track chain 16. Also shown in FIG. 1 are an idler 18 and a pair of bottom rollers 22, 24.

Each link 10 in FIG. 1 includes a shoe abutment surface 26 that is connected to a shoe 28 via one or more fasteners 32. Opposite shoe abutment surface 26 is a rail 34, or the top edge of the link 10 that engages the bottom rollers 22, 24, and the idler or sprocket 18. The rail 34 is replaceable, as discussed below. A seam 36 is shown between the rail 34 and the link body 42. As explained below, brazing or soldering provides the surprising advantage that the replaceable rails 34 can be securely attached to the link bodies 42 and then removed when worn because the filler metal that is used to join the link body 42 to the rail 34 has a lower melting point to the link body 42 or the rail 34. Thus, heating a track link 10 with a worn rail 34 to a temperature above the melting temperature of the filler metal but below the melting temperatures of the rail 34 and link body 42 enables one to remove a worn rail 34 and replace it with a new or reconditioned rail 34.

Figure 2:
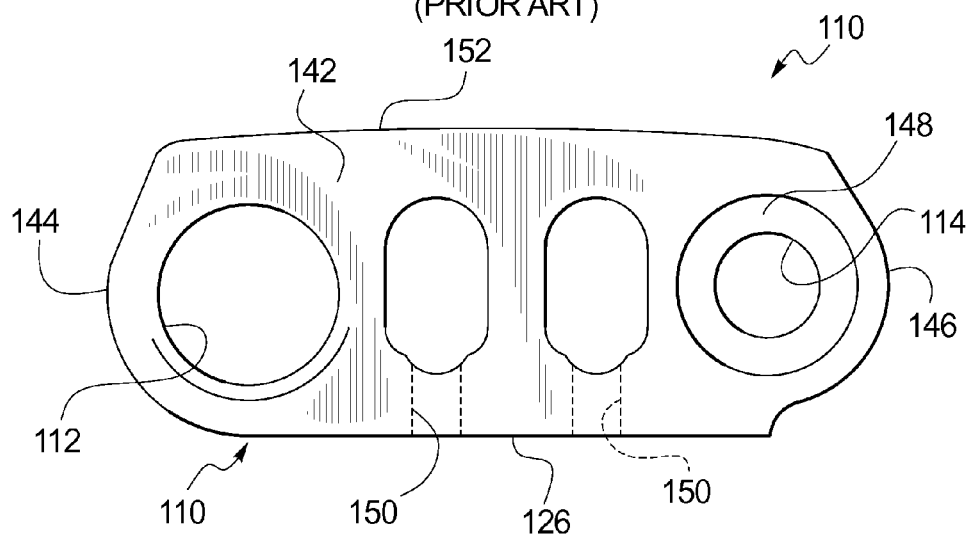
FIG. 2 is a side view of a prior art track link with integrated rail and link body.

Referring to FIG. 2, a worn prior art track link 110 is shown with the shoe abutment surface 126 disposed at the bottom of the orientation shown in FIG. 2 and a bearing surface 152 shown at the top of the track link 110. The track link 110 also includes an elongated link body 142 which includes two opposite ends 144, 146. The bore 112 shown in FIG. 2 is larger than the bore 114 due to the presence of the bushing counterbore 148. A pin is accommodated in the bore 114 for connecting one pair of track links to another pair of track links and the bushings in bore 112 and counter bore 148 connect the track link 110 shown in FIG. 2 to an adjacent or parallel link of the track chain 16 (FIG. 1). Threaded openings 150 are used to accommodate the fasteners 32 (FIG. 1) for securing the shoes 28 (FIG. 1) to the links 10. With the prior art track link 110, the rail shown at 34 in FIGS. 1 and 3-6 is in fact an integrated part of the track link 110. Both the bearing surface 152 and the link body 142 are made of the same material. But the rail 134 usually receives local hardening to enhance its wear resistance.

Figure 4:
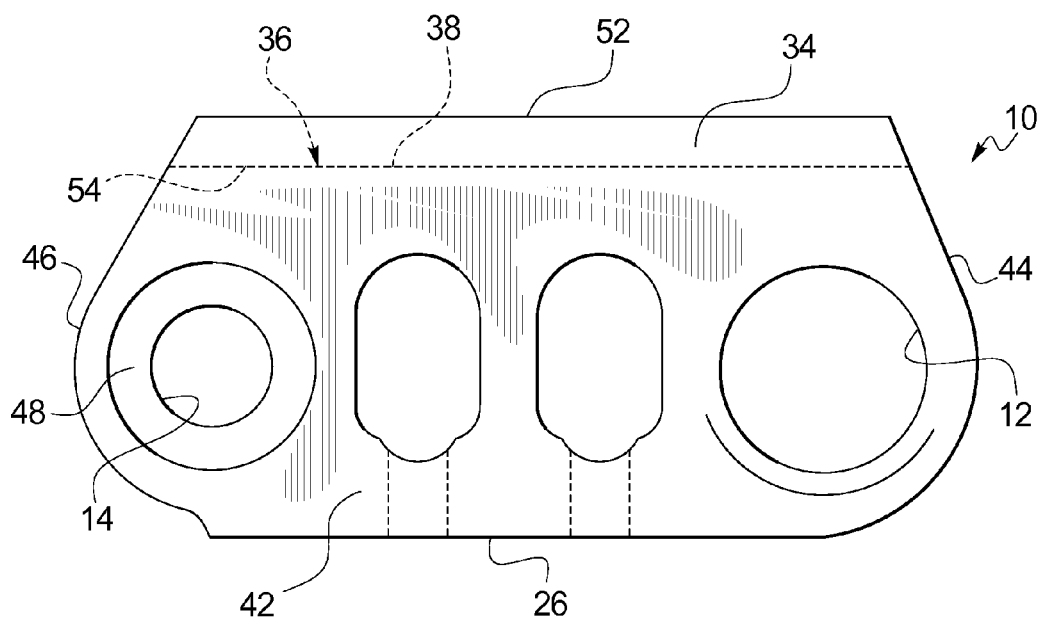
FIG. 4 is a side view of a disclosed track link that includes a replacement rail and link body brazed or soldered together.

As shown in FIGS. 1 and 4, the shoe abutment surface 26 of the link 10 is largely protected by the shoe 28 fastened thereto. On the other hand, the rail 34 (FIG. 1) engages the bottom rollers 22, 24, the idler 18 amongst other elements of the undercarriage 11 of the track-type machine that are not shown in FIG. 1. Thus, the rails 34 are prone to wear. With the prior art track link 110, no rail is provided on the bearing surface 152, which serves as a rail, and because of the problems associated with refurbishing a worn link 110, many users simply replace the entire link 110 as opposed to attempting to refurbishing a worn rail or bearing surface 152.

Figure 3:
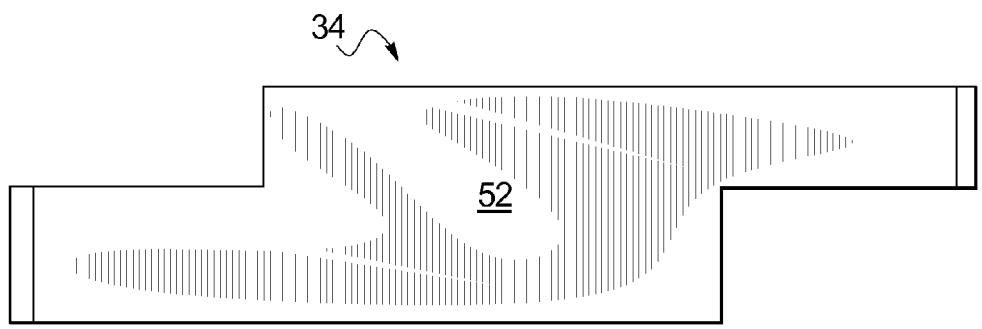
FIG. 3 is a top plan view of a disclosed replacement rail.
Figure 5:
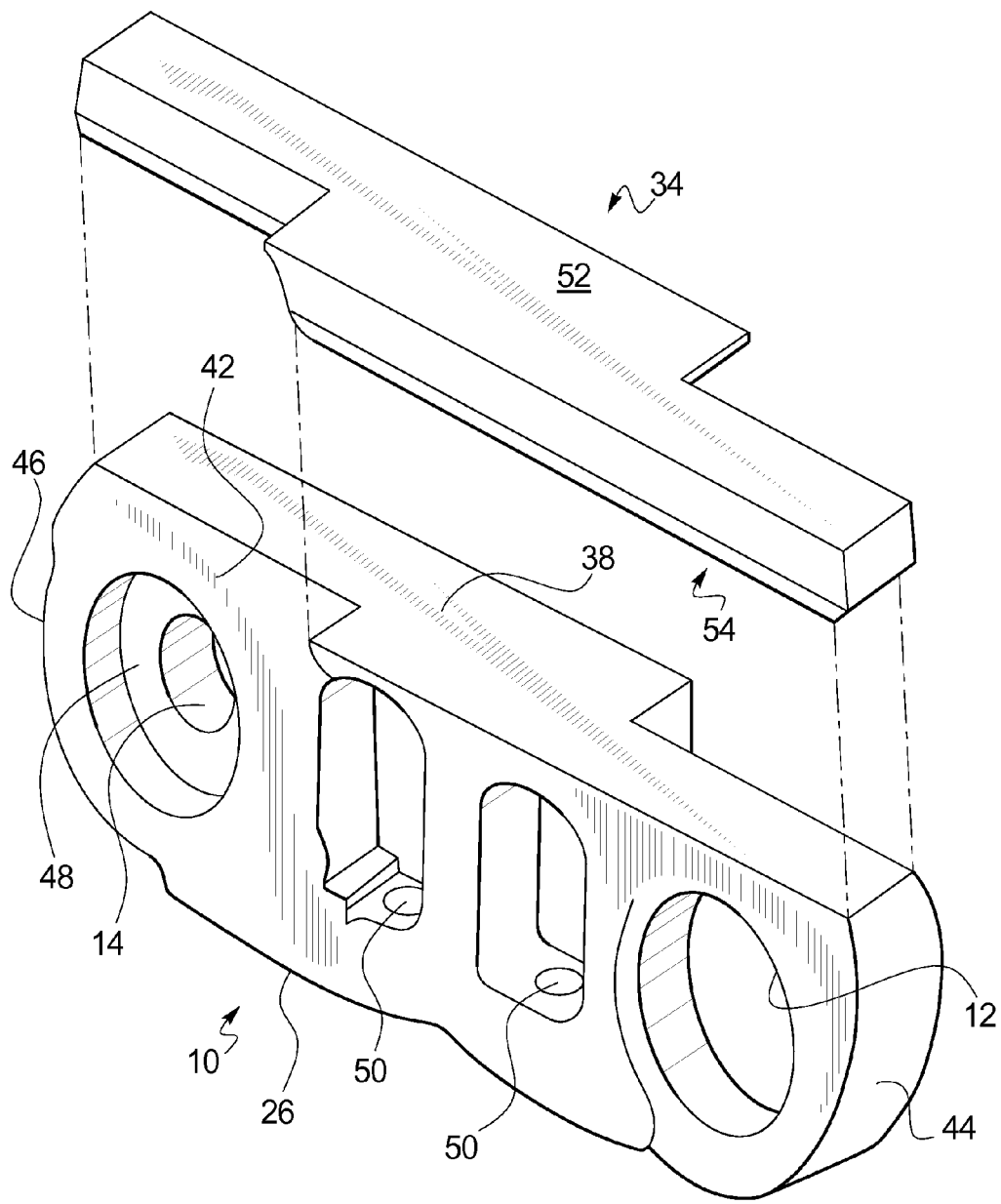
FIG. 5 is a perspective and exploded view of the track link body and replacement rail of FIGS. 3-4.

A solution to this problem is a composite track link as provided in FIGS. 3-5. The composite track link 10 is composed of a replaceable rail 34 and the link body 42, and the two pieces are bonded together through a brazing or soldering joint between the two. In FIG. 3, a replacement rail 34 is shown with an upper bearing surface 52 for bottom rollers 22, 24, idlers 18, etc. and a corresponding lower brazing or soldering surface 54 which is connected to the bearing surface 38 of the track link body 42 using a brazing or soldering technique. First, the bearing surface 38 of the link body 42 may be ground flat or shaped so its contour fits the lower brazing or soldering surface 54 of the replaceable rail 34. Then the rail 34 and link body 42 are heated to a temperature above melting temperature of a filler metal used to braze or solder the rail 34 to the link body 42. The rail 34 is then placed onto the bearing surface 38 as shown in FIG. 4 and the liquid filler metal is drawn into the seam 36 via capillary action. As the liquid filler metal solidifies, it firmly bonds the link body 42 and rail 34 together. Various brazing or soldering techniques can be used to join the rail 34 and the link body 42. For example, the filler metal powder paste can be sprayed, or the filler metal shim be placed, on the bearing surface 38 before the rail 34 and the link body 42 are assembled together. Heat can then be applied to the assembly or one part of it to braze or solder the rail 34 to link body 42. The brazed or soldered assembly or one part of it can be further heat treated to modify material properties.

Thus, the bearing surface 38 of the link body 42 may need to be ground or shaped so it conforms to the lower brazing or soldering surface 54 of the replacement rail 34. The rail 34 is then placed on the bearing surface 38 of the link body 42 and, after heating the link body 42 and rail 34 to a temperature above the melting temperature of the filler metal, filler metal is then inserted into the seam 36 via capillary action.

Many brazing materials are available. The most widely used commercial materials include copper-based, nickel-based and silver-based brazing materials. All three types of materials will work for this application, but copper-based brazing materials provide the lowest cost. Newly developed iron-based brazing materials will work as well. Copper brazing materials can have a melting temperature between 580-1083° C. depending on alloys. Silver brazing materials can have melting point between 600-960° C. Nickel-brazing materials can have melting point between 875-1140° C. The brazing operation temperature is usually a bit higher than the melting point.

The possible soldering materials are zinc-based and tin-based soldering alloys. The soldering temperature should be around 180-450° C. 450° C. is the dividing line between soldering and brazing. Above 450° C. it is classified as brazing. Below 450° C. it is classified as soldering. The fundamentals for brazing and soldering are essentially the same.

Currently medium-carbon low-alloy steels are used for both link body and the rail (they are in fact one part). Typical alloys are SAE 41B30, SAE 50B35 etc. These alloys have about 0.3-0.35% carbon and small amount of Mn, Cr, B as alloys. With the replaceable rail design, the body of the link can use the same material as current to provide the strength. The rail can use the same material as the body, but most likely it will have higher carbon and alloy contents, for example tool steels, to increase its hardness and wear resistance. One link body has a hardness of about 30 HRC. One rail has a hardness of 50-55 HRC. The higher hardness on the rail is achieved with a local induction hardening operation. The rail can have a hardness of from about 50 up to about 65 HRC depending on which material being used.

Furnace heating, induction heating, flame (torch) heating can be used for brazing. Other brazing processes (such as dip brazing, resistance brazing, etc.) may be used as well. Induction heating should be the most favorable method for this application. The replaceable rail receives the heat from the induction heater next to it, until the temp is high enough to melt the brazing material at the rail/link body interface. After the brazing material solidifies, the remaining heat in the rail is still sufficient for a hardening operation. This process causes minimal change to the link body so it can still maintain its shape and properties.

INDUSTRIAL APPLICABILITY

Figure 6:
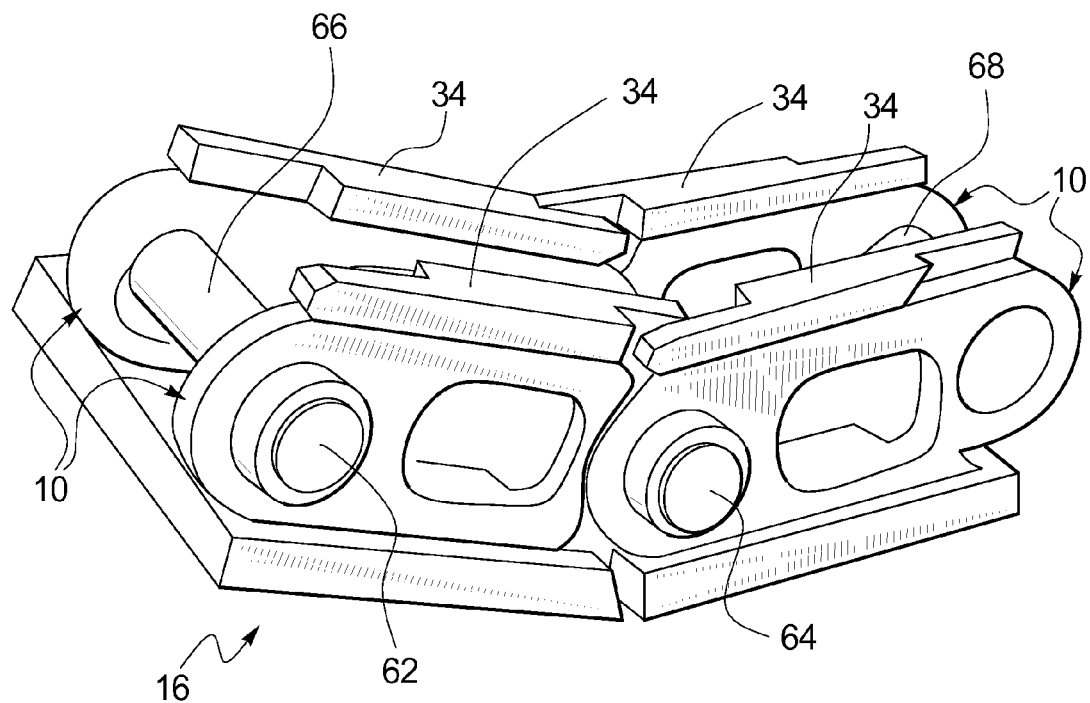
FIG. 6 is a perspective view of part of an endless track showing two pairs of composite track links and two shoes.

FIG. 6 provides a partial perspective view of a track chain 16. Four composite track links 10 are shown, each equipped with a replaceable rail 34. The track pin 62 connects the track links 10 shown at the left in FIG. 6 to a proceeding pair of track links 10 (not shown). The two bushings 66, 68 on track pins 62 and 64 connect a pair of parallel track links 10 together. The pin 64 connects the pair of track links 10 shown at the right to the pair of track links 10 shown at the left.

Thus, a track link 10 is disclosed having a body 42 and a replaceable rail 34 brazed or soldered together to provide a metallurgical bond between the link body 42 and the rail 34 such that the rail 34 may be removed and replaced by heating to a temperature above the melting temperature of the brazing or soldering filler metal. Using the disclosed system, the link body 42 of the track link 10 may outlast the rails 34 by multiple use cycles. Further, the body 42 of the track link 10 and the rail 34 may be formed of different materials which may reduce costs and extend rail wear life.

In general, a rail 34 may be removed from a track link 10 by heating the brazed or soldered joint or by heating the rail 34 and link body 42 to a temperature above the melting temperature of the brazing or soldering filler metal. The rail 34 may then be removed. After the bearing surface 38 of the track link body 42 has been prepared, a rail 34 may be moved into position as illustrated in FIG. 5. Using additional heat, brazing or soldering filler metal may be inserted through the seam 36 via capillary action to join the rail 34 and link body 42 together. The brazed or soldered assembly or one part of it can be further heat treated to modify material properties.

The improved track link 10 saves costs by eliminating the need to replace the entire track link 10 in the event the rail 34 becomes worn and by facilitating the repair of the track link 10 when the rail 34 does become worn. The novel use of brazing or soldering to remove the replaceable rail 34 for purposes of replacing it with a new or reconditioned rail 34 makes the track link 10 repairable and extends its working life.

To repair a disclosed track link 10, the track link 10 or part of it is heated to a temperature above the melting temperature of the brazing or soldering material but less than the melting temperature of the body 42 and the rail 34. Upon reaching such a temperature, the worn rail 34 may be removed from the bearing surface 38 and a new rail 34 may be attached to the bearing surface 38 by at least one of brazing and soldering.

What is claimed is:

1. A method for replacing a worn rail of a track link, the method comprising:
    providing a track link having a body with a bearing surface, the bearing surface being connected to a brazing or soldering surface of a worn rail by at least one of brazing and soldering with a filler metal;
    heating the track link to a temperature above a melting temperature of the brazing or soldering material but less than melting temperatures of the body and worn rail;
    removing the worn rail from the bearing surface; and
    attaching a new rail to the bearing surface by at least one of brazing and soldering.

2. The method of claim 1 further including providing a bearing surface disposed along one edge of the link and providing a shoe abutment surface disposed along an opposite edge of the link.

3. The method of claim 1 further including fabricating the link body and rail from steel.

4. The method of claim 1 further including fabricating the link body and rail from different materials or the same material but having different hardness properties.

5. The method of claim 1 further including fabricating the rail from a first material and fabricating the link body from a second material wherein the first material is more resistant to wear than the second material.

6. The method of claim 1 further including providing complementary brazing or soldering and bearing surfaces.

* * * * *